Patented Nov. 26, 1940

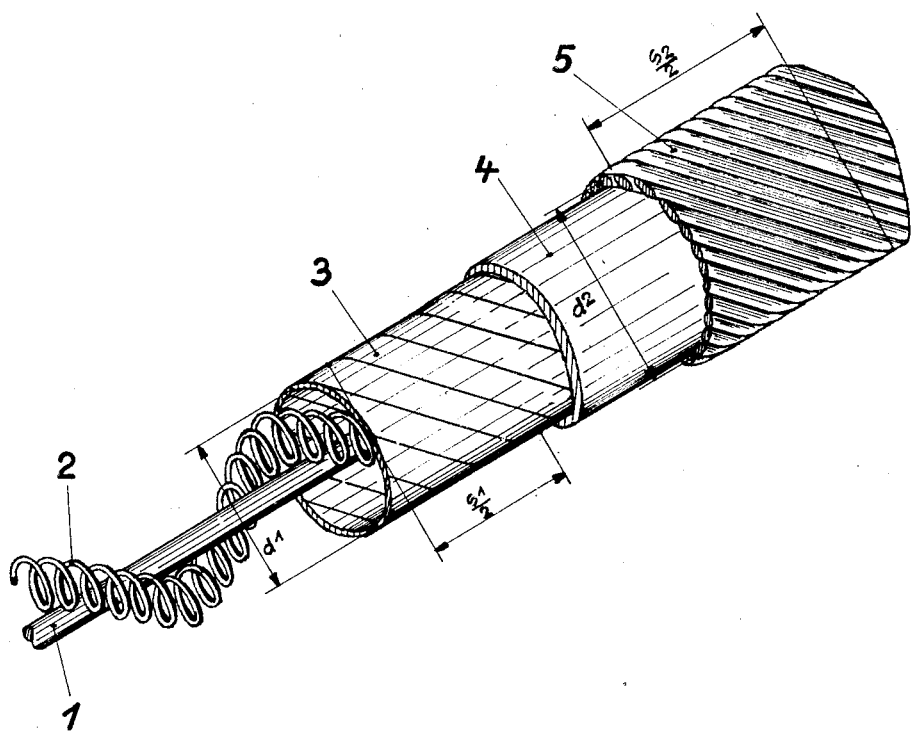

2,223,140

UNITED STATES PATENT OFFICE 2,223,140

CABLE

Franz Unterbusch, Cologne-Mulheim, Germany, assignor to Felten & Guilleaume Carlswerk Actien-Gesellschaft, Cologne-Mulheim, Germany Application December 12, 1936, Serial No. 115,611
In Germany December 18, 1935

2 Claims. (Cl. 174—29)

The present invention relates to cables and more specifically pertains to high frequency cables of the air space insulation type.

It has been explained in Patent No. 2,189,090 of February 6, 1940, that in cables with a plurality of helical elements, for instance, in the case of high frequency cables with a concentric return conductor and armouring lying over it in the usual stranding, there is a danger of the helical metal bands serving as the return conductor buckling during the laying, and that this buckling can be avoided if the metal bands of the return conductor and the wire armouring lying over it are applied with the same direction of lay. Such buckling-in takes place when the cable is subjected to torsional stresses. If a cable, the elements of which are stranded in different layers in opposite directions, is twisted in such a way that the elements lying on the outside, for instance the helically provided armouring wires, turn towards one another, then the bands lying under them will turn from one another and buckle-in as they cannot otherwise escape.

If helically stranded elements are twisted, an increase or decrease in the diameter occurs when the position of the elements remains the same, and when the diameter remains the same there is an increase or decrease in the length, according as to whether the helical structure winds in or out. The extent of the changes is dependent on the diameter and on the pitch of the corresponding layer.

The following calculation shows that with certain assumptions, and with a suitable choice of the lengths of lay, the lengthenings or shortenings of the individual stranding elements, which arise in the case of torsions become the same as regards direction and value.

If $D1$ is the diameter and $S1$ the length of lay of the elements and $L1$ the length of the elements in the return conductor 3 while $V$ is the test cable length under consideration then $$N1 = \frac{V}{S1}$$

is the number of laying length for the test cable length.

If $D2$ is the diameter and $S2$ the length of lay of the elements and $L2$ the length of the elements in the armouring 5 then $$N2 = \frac{V}{S2}$$

is the number of laying length for the test cable length.

With $L1$ and $L2$ indicating the total length of the elements in the return conductor and the elements in the armouring, $$L1^2 = N1^2(S1^2 + D1^2\pi^2)$$

and $$L2^2 = N2^2(S2^2 + D2^2\pi^2)$$

since the length of the elements in the return conductor and the armouring on one laying length is $$\sqrt{S1^2 + D1^2\pi^2}$$

and $$\sqrt{S2^2 + D2^2\pi^2}$$

This results from the winding of the helical elements. Then there will be obtained a right angle triangle with a base line $D1 \times \pi$ and with a height of $S1$. The length of the longest side of this triangle is then $$\sqrt{S1^2 + D1^2\pi^2}$$

In unwinding not only a laying length but an entire element there will result a right angle triangle with a base line $N1D1\pi$ with a height $N1S1$ and the longest side is $L1$. It follows therefrom:

(2) $L1^2 = N1^2S1^2 + N1^2D1^2\pi^2$ and
$$L2^2 = N2^2S2^2 + N2^2D2^2\pi^2$$

(3) $V^2 = N1^2S1^2 = L1^2 - N1^2D1^2\pi^2 = L2^2 - N2^2D2^2\pi^2$ (4) $V = \sqrt{L1^2 - D1^2\pi^2 N1^2} = \sqrt{L2^2 - D2^2\pi^2 N2^2}$ From Equation (2)

$$L1 = \sqrt{D1^2\pi^2 N1^2 + S1^2 N1^2} = S1N1\sqrt{1 + \frac{D1^2\pi^2}{S1^2}}$$

If $S1N1 = V$ is introduced (5) $$L1 = V\sqrt{1 + \frac{D1^2\pi^2}{S1^2}}$$

$$L2\sqrt{D2^2\pi^2 N2^2 + S2^2 N2^2} = S2N2\sqrt{1 + \frac{D2^2\pi^2}{S2^2}} =$$

$$V\sqrt{1 + \frac{D2^2\pi^2}{S2^2}}$$

If the conductors are now placed under torsion and the length of the conductor is $V$ before the application of a torsional force and $V + \Delta V1$ after the torsion and the length of the armour is $V$ before the torsion and $V + \Delta V2$ after the torsion it is apparent that with each twist the number of lay lengths which apply to the test length is increased by one. After the torsion the number of lay lengths is no longer $N1$ or $N2$ but $N1 + A$ and $N2 + A$.

After a torsion if $V+\Delta V1$ or $V+\Delta V2$ are substituted for $V$ in Equation (4) and $N1+A$ is substituted for $N1$ and $N2+A$ is replaced by $N2$ the following results:

(6) $V1 = V + \Delta V1 = \sqrt{L1^2 - D1^2\pi^2(N1+A)^2} =$
$\sqrt{L1^2 - D1^2\pi^2 N1^2 - 2N1 D1^2\pi^2 A - D1^2\pi^2 A^2}$ $V2 = V + \Delta V2 = \sqrt{L2^2 - D2^2\pi^2(N2+A)^2} =$
$\sqrt{L2^2 - D2^2\pi^2 N2^2 - 2N2 D2^2\pi^2 A - D2^2\pi^2 A^2}$ Substituting $L1^2 - D1^2\pi^2 N1^2 = V^2$ and $$N1 = \frac{V}{S1}$$

the following results:

(7) $V1 = V + \Delta V1 =$
$\sqrt{V^2 - 2D1^2\pi^2 \frac{V}{S1} \times \frac{AV}{S1 N1} - D1^2\pi^2 A^2 \frac{V^2}{S1^2 N1^2}}$
$= V\sqrt{1 - \frac{D1^2\pi^2}{S1^2}\left(\frac{2A}{N1} + \frac{A^2}{N1^2}\right)}$ $V2 = V + \Delta V2 = V\sqrt{1 - \frac{D2^2\pi^2}{S2^2}\left(\frac{2A}{N2} + \frac{A^2}{N2^2}\right)}$ (8) $\Delta V1 = V1 - V = V\sqrt{1 - \frac{D1^2\pi^2}{S1^2}\left(\frac{2A}{N1} + \frac{A^2}{N1^2}\right)} - V$ $\Delta V2 = V2 - V = V\sqrt{1 - \frac{D2^2\pi^2}{S2^2}\left(\frac{2A}{N2} + \frac{A^2}{N2^2}\right)} - V$ If the two length changes $\Delta V1$ and $\Delta V2$ are equal no inner tensions will arise between the conductors and the armouring and $\Delta V1$ will equal $\Delta V2$ if (9) $\frac{D1^2\pi^2}{S1^2}\left(\frac{2A}{N1} + \frac{A^2}{N1^2}\right) = \frac{D2^2\pi^2}{S2^2}\left(\frac{2A}{N2} + \frac{A^2}{N2^2}\right)$ The members $$\frac{A^2}{N1^2}$$

and $$\frac{A^2}{N2^2}$$

may be neglected with respect to the members $$\frac{2A}{N1}$$

and $$\frac{2A}{N2}$$

and

(10) $\frac{D1^2}{S1^2} \times \frac{2A}{N1} = \frac{D2^2}{S2^2} \times \frac{2A}{N2}$ and introducing $$N1 = \frac{V}{S1}$$

and $$N2 = \frac{V}{S2}$$

(11) $\frac{D1^2}{S1} = \frac{D2^2}{S2}$ or $\frac{S1}{S2} = \frac{D1^2}{D2^2}$

The lengthenings are thus the same in both stranding layers if the lengths of lay are in the same ratio as the squares of the diameters.

If use is made of this calculation as a basis there is obtained in the case of great differences in the diameters of the stranding layers, either very short laying lengths of the outer conductor, which is not desirable for electrical reasons, or very great laying lengths of the armouring, which is not desirable for stranding reasons. It is therefore proposed to choose a slightly smaller ratio between 1.5 and 2 power. Since it has been assumed in the case of the armouring that the diameters remain constant and must remain constant and this need not be exactly fulfilled, the proposed choice of the ratio between 1.5 and 2 power is admissible. The choice of this ratio leads to admissible laying lengths of the outer conductor and armouring.

Since cables according to the invention, when drawn out, tend more easily to twist than cables, the elements of which are stranded together in alternate directions, it is advisable to provide over the armouring one or more layers of wires or bands, the direction of which is opposite to that of the armouring.

The accompanying drawing illustrates, by way of example, one form of carrying out the invention. The inner conductor 1 is separated from the outer concentric conductor 3 of copper bands by an insulating helix 2 of polystyrol. Over the return conductor 3 there is provided the lead sheathing 4 and the wire armouring 5.

The wire armouring and the bands of the return conductor 3 have the same direction of lay and their laying lengths S1 and S2 have approximately the same ratio as the squares of their diameters D1 and D2 so that the following ratio holds good:

$$\frac{S1}{S2} = \frac{D1^2}{D2^2}$$

I claim:

1. An electrical cable wherein the stresses tending to buckle the elements of the cable are completely avoided comprising, a central metal conductor, a second conductor arranged over and substantially concentric with respect to the first conductor, yieldable insulating means consisting of a continuous flexible spacer element interposed between said conductors providing air space insulation between the conductors which space may be altered during bending of the cable, said second conductor consisting of a plurality of metal bands helically arranged adjacent each other, an outer armouring consisting of a plurality of helically arranged wires, said metal bands and the wires extending along the length of the central conductor with the same direction of lay and the ratio of the lay length of the metal bands and the wires falling within a ratio range between the 1.5 power and the square of the diameters of the second conductor and the armouring.

2. An electrical cable wherein the stresses tending to buckle the elements of the cable are completely avoided comprising, a central metal conductor, a second conductor arranged over and substantially concentric with respect to the first conductor, yieldable insulating means consisting of a continuous flexible spacer element interposed between said conductors providing air space insulation between the conductors which space may be altered during bending of the cable, said second conductor consisting of a plurality of metal bands helically arranged adjacent each other, an outer armouring consisting of a plurality of helically arranged wires, the direction of lay of the metal bands and the wire being the same and having the lay length thereof of approximately the same ratio as the squares of the respective diameters therof.

FRANZ UNTERBUSCH.